United States Patent [19]

Kline

[11] 4,234,953
[45] Nov. 18, 1980

[54] ERROR DENSITY DETECTOR

[75] Inventor: Ralph L. Kline, Los Altos, Calif.

[73] Assignee: GTE Automatic Electric Laboratories Incorporated, Northlake, Ill.

[21] Appl. No.: 967,192

[22] Filed: Dec. 7, 1978

[51] Int. Cl.³ .................... H04B 17/00; G06F 11/00
[52] U.S. Cl. ........................................ 371/5; 371/47
[58] Field of Search .............. 340/146.1 AX, 146.1 D; 178/69.1, 69 G; 371/5, 47

[56] References Cited

U.S. PATENT DOCUMENTS

| | | | |
|---|---|---|---|
| 3,036,290 | 5/1962 | Zarouni | 340/146.1 AX |
| 3,159,811 | 12/1964 | James et al. | 340/146.1 AX |
| 3,646,517 | 2/1972 | Waters et al. | 340/146.1 AX |
| 3,721,959 | 3/1973 | George | 340/146.1 AX |
| 3,725,860 | 4/1973 | Kemper et al. | 340/146.1 AX |
| 3,733,585 | 5/1973 | Merlo | 340/146.1 D |
| 3,760,354 | 9/1973 | Ginn | 340/146.1 D |
| 4,080,589 | 3/1978 | Kline | 340/146.1 AX |
| 4,158,193 | 6/1979 | D'Antonio | 340/146.1 D |

*Primary Examiner*—Charles E. Atkinson
*Attorney, Agent, or Firm*—Leonard R. Cool

[57] ABSTRACT

An error detector provides an output pulse whenever an error is detected in the framing pattern of a digital transmission system. A sample timer provides a sample pulse at the beginning of each sample interval and a sample clock pulse during the sample pulse. The sample interval includes a plurality of frames and the sample pulse occurs intermediate of the framing pattern. A logic arrangement is responsive to the error output pulse, the sample clock pulse and the sample pulse for providing an alarm indication when the number of error pulses equals or exceeds a first predetermined number during a sample interval. Conversely, the logic arrangement eliminates the alarm indication if the number of errors in a subsequent sample interval is less than a second predetermined number.

5 Claims, 2 Drawing Figures

ERROR DENSITY DETECTOR

BACKGROUND OF THE INVENTION

1. Field of the Invention

This invention relates to error counters for digital transmission systems and, in particular, to an arrangement for determining if the density of errors equals or exceeds the first predetermined number, in which case an alarm indication is provided, or, conversely, to eliminate the alarm indication if the density of errors is less than a second predetermined number.

2. Description of the Prior Art

In a number of prior-art systems which employ digital transmission techniques, the presence of an occasional error is not critical to the recovery of the information contained in the transmitted signal. For example, PCM systems in common use in the United States today employ pulse code groups for each of the 24 channels within the system, each code group containing eight digits. Thus, 192 digits represent the time slots or the total number of digits for each frame. In addition to the code groups, there is a winking framing pulse added at the end of the 192nd digit so that each frame contains 193 time slots with the winking framing pulse occurring in the 193 rd time slot. An occasional error could occur in any one of the pulse code groups or an error could occur in the time slot for the framing digit such that the 1 could be represented as a 0 or the 0 could be represented as a 1 without the occasional errors having a significant deleterious effect on the decoding of the received information. In either case, it is not the occasional error which creates a problem, but it is the repetition of errors occurring within a predetermined time interval which is indicative either of trouble in the transmission medium or in the transmission equipment. Thus, an error density is used to determine at what point in time the number of errors occurring is critical to transmission. Error density is related to the number of errors detected within a predetermined time interval.

As is well known, opposite ends of a digital transmission system are said to be synchronized when the clock frequencies have the same frequency and phase. With respect to PCM systems, it is additionally necessary that they be in step with respect to the digits in the code groups. When the transmitter and receiver are properly synchronized, they are described as being in-frame. When they are not properly synchronized, they are described as being out-of-frame. Thus, identification of the framing information at the receiving end of the system is important, and a means for comparison with respect to what the actual framing condition, i.e., 1 or 0, is supposed to be is of importance. However, it is also important not to restart a reframing cycle on the first detection of an error in the framing comparator. This is discussed in detail on pages 1-15, and in particular pages 14-15, in the article by Davis, D. P., "An Experimental Pulse Code Modulation System for Short-Haul Trunks," Bell System Technical Journal, volume 41, January 1962. FIG. 10 at page 16 shows a simplified drawing of a framing detector using the incoming signal from the received PCM line, and it should be particularly noted that an integrator is used at the output of the framing detector to integrate errors which are recognized by the detector, with a particular level being reached before an out-of-frame condition is indicated.

It is also possible to detect errors in data transmission systems and, in particular, those which employ the duo-binary waveform. An error detection arrangement is disclosed in U.S. Pat. No. 3,303,462. Further, the patent discloses a digital counting arrangement for counting the number of errors which occur and, in addition, the counting arrangement uses a clock reset input whereby the counter is reset to 0 periodically. It is important to note that the clock reset timing is independent of error occurrences, and the error counting arrangement includes no provision for resetting the counter 29 after a predetermined period in which the number of errors in less than a predetermined number.

Another error density detector arrangement is shown in U.S. Pat. No. 2,080,589, issued Mar. 21, 1978, inventor Ralph LeRoy Kline. In that invention the time during which errors are to be counted was initiated by the first error input signal which set a predetermined time interval during which the errors would be counted.

SUMMARY OF THE INVENTION

An error density detector includes an error detector which detects errors in the framing pattern, a timer which provides at a first output a sample pulse at the beginning of each sample interval, said sample interval including a plurality of frames and said sample pulse occurring intermediate of said framing pattern; and a logic arrangement responsive to said error output pulse, and the sample pulse for providing an alarm indication when the number of error output pulses equals or exceeds a first predetermined number during a sample interval; or for eliminating said alarm indication if the number of errors in a subsequent sample interval is less than a second predetermined number.

DETAILED DESCRIPTION OF THE INVENTION

Figure 1:
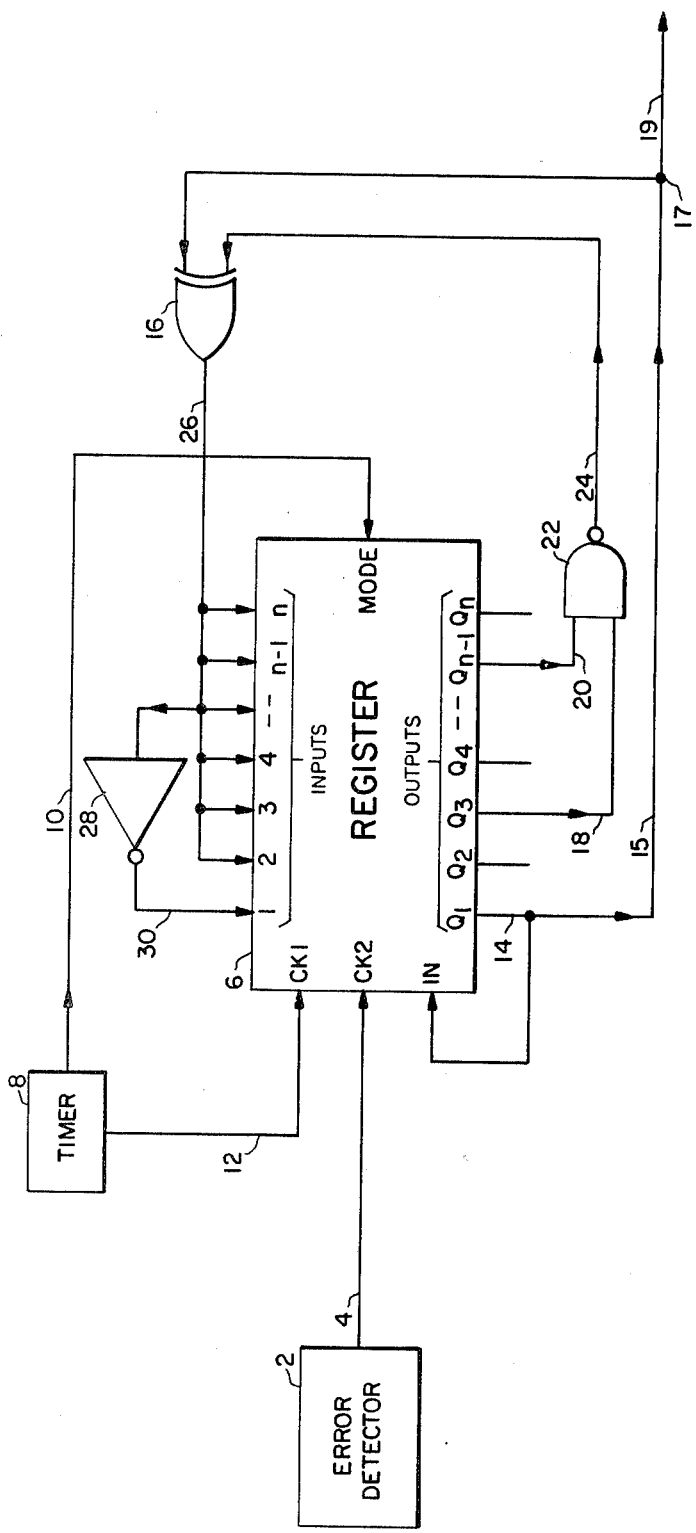
FIG. 1 is a simplified block diagram of a preferred embodiment of the error density detector of the instant invention.
Figure 2:
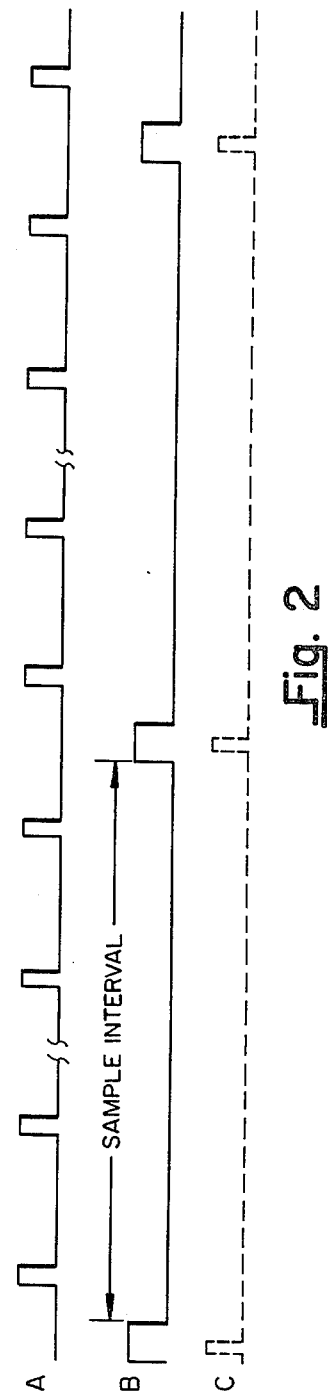
FIG. 2 is a waveform diagram illustrated by pulses, in waveform A, the location of framing time slots and, thus, possible error positions; sample pulses occurring at the beginning of each sample interval in waveform B; and, sample clock pulses occurring within the sample pulse of waveform B in waveform C.

Referring now to FIG. 1, error detector 2 will provide an output pulse on path 4 whenever an error occurs in the framing pattern. Error detectors such as 2 are well known in the art and will not be further described here. Register 6 has programmed inputs 1-n, and it is to be noted that input 1 will always be of the opposite state from programmed inputs 2-n. Considering first the in-frame condition, the output of Exclusive-OR gate 16 is binary "0" thus the programmed inputs are a binary "1" at input 1, and a binary "0" at all other programmed inputs. At the beginning of each sample interval a sample pulse from timer 8 appears on path 10 and is applied to the mode input of register 6, which changes the register from a serial shift register to a parallel loaded register. During the time that the sample pulse is present a sample clock pulse is supplied from timer 8 via path 12 to the clock 1 input of register 6. The mode lead thus goes high for an interval and this interval occurs between the framing pattern error positions as shown in FIG. 2. This allows the programmed inputs to be loaded in parallel when the sample clock pulse in input ck1 goes low. The Q1 output is thus binary "1" and the Q3 and Qn-1 are both binary "0". Thus, NAND-gate 22 has a binary "1" output is applied via path 24 to one input of Exclusive-OR gate 16. The other input to Exclusive-OR gate 16 is also a binary "1" applied from the Q1 output via path 14, path 15, and junction 17 to the second input. Thus the output on path 26 is a binary "0"

When the sample pulse goes low again the sample interval begins and errors appearing on path 4 are applied to ck2 input of register 6 which shift the binary "1" input to the right. This occurs because the Q1 output is applied as the serial input to the register. If Qn-2 or more errors occur NAND-gate 22 will have binary "1" inputs on both paths 18 and 20 and thus will provide a binary "0" output on path 24. This will cause binary "1" and binary "0" states to appear at the inputs to Exclusive-OR gate 16 and will thus change the output state from binary state "0" to binary "1". The programmed inputs have now been reversed with binary "0" appearing at the 1 input of register 6. At the beginning of the next sample interval these programmed inputs will be read into the outputs causing Q1 to change to the out-of-frame condition (binary "0"), and it may be seen that the output state of Exclusive-OR gate 16 will be changed to binary "0". Thus register 6 is programmed initially to return to an in-frame condition and this will occur providing the errors occurring during the next interval are less than a second predetermined number. In this case with binary "0" being incremented in the register, it is only necessary that one input to NAND-gate 22 change state in order for the Exclusive-OR gate 16 to change state. Thus, two error pulses on path 4 will advance the binary "0" to the Q3 position at which time the output of NAND-gate 22 will change state and become a binary "1". This changes the programmed input to register 6 to the alarm, or out-of-frame condition and the process repeats until there are fewer than 2 errors during the subsequent sample interval.

While the invention has been particularly shown and described with reference to a preferred embodiment thereof, it will be understood by those skilled in the art that changes in form and detail may be made therein without departing from the spirit and scope of the invention. For example, the length of the sample interval which may be considered to be a "window" can be varied by changing the period of timer 8. Timer 8 could be derived from the receiver's frame counter, i.e., by counting down so that the sample interval would occur only after n frames. It is to be noted that the number of possible error positions in the sample interval is the denominator of the two predetermined error density ratios. The numerator of the first error density ratio is the number of errors required to go from an in-frame to an out-of-frame condition. In the example shown in FIG. 1 this would be the number of errors required to shift binary 1's into both inputs of NAND-gate 22, which is n-2 errors. For the second error density ratio the denominator may be the same but now the number of errors which may be allowed during a sample interval in which the status would be changed from an out-of-frame condition to an in-frame condition must be less than the numerator. Again referring to the example of FIG. 1, it is to be noted that the number of errors allowed is the number which will not shift a binary "0" into either input of NAND-gate 22, which is one error or less, and, therefore, the second numerator is two. In either case the numerators can be changed by changing the output connection from register 6. Further the denominator of the two densities would normally be the same but they may be changed, for example, by using the alarm signal output on path 19 to change the decoding of the sample interval, i.e., the count of timer 8.

What is claimed is:

1. In a digital transmission system in which the presence or absence of errors in a periodic framing pattern is used to determine if the system is properly synchronized, an error density detector comprising:
   an error detector which provides an error output pulse at an output whenever an error is detected in the framing pattern;
   a timer which provides at a first output a sample pulse at the beginning of each sample interval, said sample interval including a plurality of frames and said sample pulse occurring intermediate of said framing pattern; and at a second output a sample clock pulse which occurs within the time slot of the sample pulse; and
logic means comprising:
   a programmable register having n programmable input terminals 1 to n, having a mode and a first clock input connected, respectively to the first and second outputs of said timer, said programmable input terminals being enabled during the occurrence of the sample pulse so that programmed information may be read into said input terminals 1 to n in parallel, having a second clock input connected to receive the error output pulses so as to cause the register to shift one bit for each error pulse, having n output terminals Q1 to Qn, and having a serial input terminal connected to the first output terminal Q1, whereby the state programmed into the first input terminal will be propagated by said error pulse and;
   gating means for providing the program information and for providing an alarm indication, having a first input connected to Q1, having second and third inputs connected to appropriate output terminals of said register so that an alarm indication will occur only when at least a first predetermined number of errors have occurred during a sample interval and so that the alarm lead state will subsequently change if less than a second predetermined number of errors have occurred during a subsequent sample interval.

2. An error density detector in accordance with claim 1 wherein said gating means further comprises:
   a NAND-gate having first and second input terminals connected to the second and third input terminals of said gating means, and having an output terminal;
   an Exclusive-OR gate having a first input connected to the Q1 output terminal, having a second input connected to the output terminal of said NAND-gate and having an output, said Exclusive-OR gate providing a logic "1" output if the error density exceeds said first or second predetermined number and a logic "0" otherwise.

3. An error density detector in accordance with claim 2 wherein said gating means further comprises:
   an inverter having an input connected to the output terminal of said Exclusive-OR gate and having an output connected to the number 1 program input terminal; and
   having all other program input terminals connected to the output of said Exclusive-OR gate.

4. An error density detector in accordance with claim 1 or 2 wherein said first and second predetermined numbers are equal.

5. An error density detector in accordance with claim 1 or 2 in which the first predetermined number is greater than the second predetermined number.

* * * * *

UNITED STATES PATENT AND TRADEMARK OFFICE
CERTIFICATE OF CORRECTION

PATENT NO. : 4,234,953
DATED : November 18, 1980
INVENTOR(S) : Ralph L. Kline

It is certified that error appears in the above-identified patent and that said Letters Patent are hereby corrected as shown below:

Column 2, line 13, "2,080,589" should read --4,080,589--.

Column 3, line 3, --which-- should be inserted before "is".

Signed and Sealed this

Fourteenth Day of April 1981

[SEAL]

Attest:

RENE D. TEGTMEYER

Attesting Officer     Acting Commissioner of Patents and Trademarks